United States Patent
Bulluck

(10) Patent No.: US 8,206,791 B2
(45) Date of Patent: Jun. 26, 2012

(54) PROTECTIVE COATINGS FOR HIGH STRENGTH STEELS

(75) Inventor: John W. Bulluck, Spicewood, TX (US)

(73) Assignee: Texas Research International, Inc., Austin, TX (US)

( * ) Notice: Subject to any disclaimer, the term of this patent is extended or adjusted under 35 U.S.C. 154(b) by 885 days.

(21) Appl. No.: 12/152,560

(22) Filed: May 15, 2008

(65) Prior Publication Data
US 2009/0324974 A1 Dec. 31, 2009

Related U.S. Application Data

(60) Provisional application No. 60/930,254, filed on May 15, 2007.

(51) Int. Cl.
*B05D 1/02* (2006.01)
*B05D 7/16* (2006.01)

(52) U.S. Cl. .......... 427/388.1; 427/421.1; 427/426; 427/427.4; 427/427.5

(58) Field of Classification Search .......... None
See application file for complete search history.

(56) References Cited

U.S. PATENT DOCUMENTS

| | | | | |
|---|---|---|---|---|
| 3,677,869 A * | 7/1972 | Chung et al. | | 267/3 |
| 3,823,833 A * | 7/1974 | Chung | | 213/40 R |
| 4,267,299 A * | 5/1981 | Oechsle, III | | 528/48 |
| 5,895,806 A * | 4/1999 | Gajewski | | 528/60 |
| 6,699,528 B2 * | 3/2004 | McKeand | | 427/8 |
| 2005/0271881 A1 * | 12/2005 | Hong | | 428/423.1 |

* cited by examiner

*Primary Examiner* — Erma Cameron
(74) *Attorney, Agent, or Firm* — O'Keefe, Egan, Peterman & Enders, LLP

(57) ABSTRACT

A process for coating a metallic surface of an aircraft. The process includes applying to the metallic surface a composition that polymerizes to form a polyurea having a tensile strength of more than 3500 psi and at least 700% elongation. The polyurea can be formed from an A-side and a B-side, where the weight percents of components for the A-side are: from about 30 to about 65 percent of polyisocyanate; from about 15 to about 70 percent of a polytetramethylene ether glycol; diluent, from 0 to about 20 percent; where the weight percents of components for the B-side are: from 35 to about 40 percent of one or more aromatic diamines; from about 20 to about 70 percent of one or more amine terminated polyether polyols.

9 Claims, No Drawings

PROTECTIVE COATINGS FOR HIGH STRENGTH STEELS

This application claims priority to U.S. Provisional Application Ser. No. 60/930,254, filed May 15, 2007, incorporated in its entirety herein by reference.

Subject to right of the assignee afforded under a Small Business Innovation Research (SBIR) program and SBIR Project AF01-131, the U.S. government has a paid-up license in this invention and the right in limited circumstances to require the patent owner to license others on reasonable terms as provided for by the terms of contract number FA8650-04-C-5026 which was supported by The United States Air Force Research Laboratory at Wright-Patterson Air Force Base.

BACKGROUND OF THE INVENTION

This invention pertains to polyurea coatings for aircraft landing gear.

Landing gear on Air Force C-17 aircraft are subjected to challenging environments and abusive situations. Unlike other military transport planes, the unique design of the C-17 allows it to take off and land on short, austere runways. This is a tremendous tactical advantage, but unfortunately introduces unforeseen consequences. Unimproved runways are often laden with foreign object debris that, upon landing or take off, become high-energy projectiles that impact and damage the coating system on landing gear components. Coating systems for the metallic such as landing gear that take such punishing abuse are highly desirable.

SUMMARY OF THE INVENTION

The present invention provides a solution to one or more of the problems, desired concepts, and/or disadvantages discussed above.

In one broad respect, this invention is a steel substrate coated with a polyurea composition that possesses a tensile strength of more than 3500 psi and at least 700% elongation. In one embodiment, the polyurea is formed from an A-side and a B-side, where the weight percents of components for the A-side are: polyisocyanate, from about 25 to about 70 percent, preferably from about 30 to about 65 percent; polyether polyol, from about 10 to about 75 percent, preferably from about 15 to about 70 percent, more preferably from 30 to 40 percent; diluent, from 0 to about 20 percent; for the B-components, from about 0 to about percent of one or more aromatic diamines, preferably from about 10 to about percent, more preferably with the total amount of such aromatic diamines totaling from 35 to about 40 percent; amine terminated polyether polyol, from about 20 to about 80 percent, preferably from about 20 to about 70 percent, and more preferably 60 percent. If present, a coupling agent can be used in the B side in an amount from about 0 to 8 percent, more generally 0 to 8 percent, and in one embodiment about 2 percent; a pigment in an amount of 0 to 10 percent, typically about 2 to 3 percent; and a UV stabilizer in an amount from about 2 to 8 percent, typically about 2 percent.

In one broad respect, this invention is a polyurea coating system formulated from an A component side that comprises: a diisocyanate, a polyether polyol, and a diluent, and a B component side that comprises: one or more diamines, one or more polyether polyamines, a silane coupling agent, an optionally pigment, an optional UV stabilizer, and an optional nanotube component, wherein the polyurea has a tensile strength of more than 3500 psi and at least 700% elongation.

Advantageously, the coatings of this invention typically possess tensile strengths of more than 3,500 psi and at least 700% elongation.

In another broad respect, this invention is a process for coating steel comprising spraying a polyurea coating onto a steel substrate, particularly where the substrate is an aircraft including the landing gear, bay, and belly of the aircraft that are areas that can be subjected to projectile impacts from the ground when the landing gear strike such projectiles, wherein the polyurea has a tensile strength of more than 3500 psi and at least 700% elongation.

The aliphatic polyurea coatings of this invention provide improved impact damage and durability for metallic substrates such as aircraft including the bay, belly, and/or landing gear. The compositions are free of VOC and HAP, provide improved sand and rain erosion results at 420 mph, possess at least 2500 psi of adhesion to steel, may be colored, are tear resistant, and are superior to existing polyurethane coatings for land gear.

DETAILED DESCRIPTION OF THE INVENTION

Polyurea polymers are polymers which are formed from the reaction of one or more organic isocyanates with one or more organic polyamines. Polyureas can be formed by bringing the organic isocyanate(s) component(s) in contact with the organic polyamine(s) using for example static mixing equipment, high-pressure impingement mixing equipment, low-pressure mixing equipment, roller with mixing attachments and simple hand mixing techniques, as such techniques are known to those skilled in the art. Polyurea polymers are useful in caulks, adhesives, sealants, coatings, foams, and many other applications. Specific examples include, but are not limited to, truck-bed liners, concrete coatings, metal coatings, concrete caulks, roof coatings, decorative coatings, and steel coatings.

The polyurea elastomer system of the present invention generally includes two components, an (A) component and a (B) component. In particular, the (A) component includes an aliphatic or aromatic isocyanate. The aliphatic isocyanates employed in component (A) are those known to one skilled in the art. Thus, for instance, the aliphatic isocyanates are of the type described in U.S. Pat. No. 4,748,192. Accordingly, they are typically aliphatic diisocyanates and, more particularly, are the trimerized or the biuretic form of an aliphatic diisocyanate, such as hexamethylene diisocyanate, or the bifunctional monomer of the tetraalkyl xylylene diisocyanate, such as the tetramethyl xylylene diisocyanate. Cyclohexane diisocyanate is also considered a preferred aliphatic isocyanate. In addition, the diamines can include cis-1,4-diaminocyclohexane; isophoronediamine; m-xylylenediamine; 4,4'-methylenedicyclohexylamine; menthanediamine; 1,4-diaminomethylcyclohexane and substituted derivatives thereof. Laromin C-260, available from BASF Corp. is representative of a substituted 4,4'-methylenedicyclohexylamine derivative. In a most preferred embodiment, the cycloaliphatic diamine cis-1,4-diaminocyclohexane, isophoronediamine, and mixtures thereof. Other useful aliphatic polyisocyanates are described in U.S. Pat. No. 4,705,814. They include aliphatic diisocyanates, for example, alkylene diisocyanates with 4 to 12 carbon atoms in the alkylene radical, such as 1,12-dodecane diisocyanate and 1,4-tetramethylene diisocyanate. Also described are cycloaliphatic diisocyanates, such as 1,3- and 1,4-cyclohexane diisocyanate as well as any desired mixture of these isomers; 1-isocyanato-3,3,5-trimethyl-5-isocyanatomethylcyclohexane(isophorone diisocyanate); 4,4'-, 2,2'- and 2,4'-dicyclohexylmethane diisocyanate as well as the corresponding isomer mixtures, and the like. The aforementioned isocyanates can be used alone or in combination.

A wide variety of aromatic polyisocyanates may be used to form the elastomer of the present invention. Typical aromatic polyisocyanates include p-phenylene diisocyanate, polymethylene polyphenylisocyanate, 2,6-toluene diisocyanate, dianisidine diisocyanate, bitolylene diisocyanate, naphthalene1,4-diisocyanate, bis(4-isocyanatophenyl)methane, bis(3-methyl-3-iso-cyanatophenyl)methane, bis(3-methyl-4 isocyanatophenyl)methane, and 4,4'-diphenylpropane diisocyanate.

Other aromatic polyisocyanates used in the practice of the invention are methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing polyamines and corresponding methylene-bridged polyphenyl polyisocyanates therefrom are described in the literature and in many patents, for example, U.S. Pat. Nos. 2,683,730; 2,950,263; 3,012,008; 3,344,162 and 3,362,979.

Usually methylene-bridged polyphenyl polyisocyanate mixtures contain about 20 to about 100 weight percent methylene diphenyldiisocyanate isomers, with the remainder being polymethylene polyphenyl diisocyanates having higher functionalities and higher molecular weights. Typical of these are polyphenyl polyisocyanate mixtures containing about 20 to about 100 weight percent diphenyldiisocyanate isomers, of which about 20 to about 95 weight percent thereof is the 4,4'-isomer with the remainder being polymethylene polyphenyl polyisocyanates of higher molecular weight and functionality that have an average functionality of from about 2.1 to about 3.5. These isocyanate mixtures are known, commercially available materials and can be prepared by the process described in U.S. Pat. No. 3,362,979.

A representative example of a common aromatic isocyanate is methylene bis(4-phenylisocyanate) or MDI. Pure MDI, quasi-prepolymers of MDI, modified pure MDI, etc. are useful. Since pure MDI is a solid and, thus, often inconvenient to use, liquid products based on MDI or methylene bis(4-phenylisocyanate) are used herein. U.S. Pat. No. 3,394,164 describes a liquid MDI product. More generally, uretonimine modified pure MDI is included also. This product is made by heating pure distilled MDI in the presence of a catalyst.

It is to be understood that the terms "aliphatic isocyanate" and "aromatic isocyanate" also include quasi-prepolymers of aliphatic isocyanates with active hydrogen-containing materials. The active hydrogen-containing materials can include a polyol or a high molecular weight polyoxyalkyleneamine, also described hereinbelow as amine terminated polyethers, or a combination of these materials.

The polyols include polyether polyols, polyester diols, triols, tetrols, etc., having an equivalent weight of at least about 500, and preferably at least about 1,000 up to about 3,000. Those polyether polyols based on trihydric initiators of about 4,000 molecular weight and above are especially preferred. The polyethers may be prepared from ethylene oxide, propylene oxide, butylene oxide, or mixtures of propylene oxide, butylene oxide and/or ethylene oxide. Other high molecular weight polyols which may be useful in this invention are polyesters of hydroxyl terminated rubbers, e.g., hydroxyl terminated polybutadiene. Hydroxyl terminated 3-quasi-prepolymers of polyols and isocyanates are also useful in this invention. The polyether polyols that are preferred in the practice of this invention are the polytetramethylene ether glycols, particularly those having a molecular weight in the range of 500 to 5000, preferably about 800 to about 2200, and more preferably from about 1000 to about 2000.

Polyamines are used in the practice of this invention to prepare the polyureas. Such polyamines include aliphatic diamines or aromatic diamines, and amine terminated polyether polyols (i.e., polyether polyamines). The aliphatic and aromatic diamines are sometimes referred to as chain extenders. Combinations of both aliphatic or aromatic diamines and one or more amine terminated polyether polyols are advantageously used in the practice of this invention. Especially preferred are aromatic diamines and amine terminated polyether polyols. The aromatic diamines useful in this invention include, for example, diethyltoluenediamine (sold commercially as, e.g., UNILINK 4200), 1-methyl-3,5-diethyl-2,4-diaminobenzene, 1-methyl-3,5-diethyl-2,6-diaminobenzene (both of these materials are also called diethyltoluene diamine or DETDA and are commercially available as ETHACURE 100), 1,3,5-triethyl-2,6-diaminobenzene, 3,5, 3',5'-tetraethyl-4,4'-diaminodiphenylmethane and the like. Aliphatic diamines include the chain extenders as described in U.S. Pat. Nos. 4,246,363 and 4,269,945. Other diamines include di(methylthio)-toluene diamine or N,N'-bis(t-butyl) ethylenediamine. Cycloaliphatic diamines that can be used include cis-1,4-diamino cyclohexane; isophorone-diamine; 4,4'-methylene di-cyclohexylamine; methanediamine; and 1,4-diamino-methyl cyclohexane. Preferably the diamine is an aromatic diamine, more preferably is diethyltoluenediamine, N,N'-dialkylamino-diphenylmethane, or a combination thereof.

Especially preferred are amine terminated polyether polyols, including primary and secondary amine terminated polyether polyols of greater than 1,500 average molecular weight having from about 2 to about 6 functionality, preferably from about 2 to about 3, and an amine equivalent weight of from about 750 to about 4,000. Mixtures of amine terminated polyethers may be used. In a preferred embodiment, the amine terminated polyethers have an average molecular weight of at least about 2,500. These materials may be made by various methods known in the art.

The amine terminated polyether resins useful in this invention are, for example, polyether resins made from an appropriate initiator to which lower alkylene oxides, such as ethylene oxide, propylene oxide, butylene oxide, or mixtures thereof, are added with the resulting hydroxyl terminated polyol then being aminated. When two or more oxides are used, they may be present as random mixtures or as blocks of one or the other polyether. In the amination step, it is highly desirable that the terminal hydroxyl groups in the polyol be essentially all secondary hydroxyl groups for ease of amination. Normally, the amination step does not completely replace all of the hydroxyl groups. However, the majority of hydroxyl groups are replaced by amine groups. Therefore, in a preferred embodiment, the amine terminated polyether resins useful in this invention have greater than 50 percent of their active hydrogens in the form of amine hydrogens. If ethylene oxide is used, it is desirable to cap the hydroxyl terminated polyol with a small amount of higher alkylene oxide to insure that the terminal hydroxyl groups are essentially all secondary hydroxyl groups. The polyols so prepared are then reductively aminated by known techniques, for example, as described in U.S. Pat. No. 3,654,370, the content of which is incorporated herein by reference.

In the practice of this invention, a single high molecular weight amine terminated polyol may be used. Also, mixtures of high molecular weight amine terminated polyols, such as mixtures of di- and trifunctional materials and/or different molecular weight or different chemical composition materials, may be used.

Also, high molecular weight amine terminated polyethers or simply polyether amines are included within the scope of this invention and may be used alone or in combination with the aforementioned polyols. The term "high molecular weight" is intended to include polyether amines having a molecular weight of at least about 2,000. Particularly preferred are the JEFFAMINE series of polyether amines available from Texaco Chemical Company; they include JEFFAMINE D-2000, JEFFAMINE D-4000, JEFFAMINE T-3000 and JEFFAMINE T-5000. These polyether amines are described with particularity in Texaco Chemical Company's product brochure entitled THE JEFFAMINE POLYOXYALKYLENEAMINES.

Other conventional formulation ingredients may be employed in component (A) or (B) as needed, such as, for example, foam stabilizers, also known as silicone oils or emulsifiers, UV stabilizers, and so on. So-called microtubes can be included. Pigments, for example, titanium dioxide, may be incorporated in the elastomer system, preferably in the (B) component, to impart color properties to the elastomer, as well as use of matting agents. Reinforcing materials, if desired, useful in the practice of our invention are known to those skilled in the art. For example, chopped or milled glass fibers, chopped or milled carbon fibers, wollostonite, nanotubes, calcium silicate, and/or other mineral fibers are useful.

The composition of this invention can be prepared with a variety of components in a variety of proportions. In one embodiment, the polyurea of this invention is formed from an A-side and a B-side, where the weight percents of components for the A-side are: polyisocyanate, from about 25 to about 70 percent, preferably from about 30 to about 65 percent; polyether polyol, from about 10 to about 75 percent, preferably from about 15 to about 70 percent, more preferably from 30 to 40 percent; diluent, from 0 to about 20 percent; for the B-components, from about 0 to about 65 percent of one or more aromatic diamines, preferably from about 10 to about 50 percent, more preferably with the total amount of such aromatic diamines totaling from 35 to about 40 percent; amine terminated polyether polyol, from about 20 to about 80 percent, preferably from about 20 to about 70 percent, and more preferably 60 percent. If present, a coupling agent can be used in the B side in an amount from about 0 to 8 percent, more generally to 8 percent, and in one embodiment about 2 percent; a pigment in an amount of 0 to 10 percent, typically about 2 to 3 percent; and a UV stabilizer in an amount from about 2 to 8 percent, typically about 2 percent.

Post curing of the elastomer of the invention is optional. Post curing will improve some elastomeric properties, such as heat sag. Employment of post curing depends on the desired properties of the end product.

The (A) component and (B) component of the present polyurea elastomer system are combined or mixed under high pressure such as using high pressure spray equipment known to on of skill in the art. For example, a first and second pressurized stream of components (A) and (B), respectively, are delivered from two separate chambers of the proportioner and are impacted or impinged upon each other at high velocity to effectuate an intimate mixing of the two components and, thus, the formation of the coating system, which is then coated onto the desired substrate via the spray gun.

The volumetric ratio of the (A) component to the (B) component is generally from about 30 to 70 percent to about 70 to 30. Typically, component (A) and component (B) are employed in a 1:1 volumetric ratio.

Advantageously, the (A) and (B) components react to form the present elastomer system without the aid of a catalyst.

The following examples are exemplary of the invention and not intended to be limiting as to the scope of the invention and claims hereto. Unless otherwise note, all amounts are by weight.

Example 1

Aliphatic Systems

Coating 1

A small batch of an aliphatic polyurea system was formulated that had the following physical characteristics: tack free time 25 seconds, Tg (C)-29.23, tensile (psi) 3348.3, elongation (%) 401.5, tear (Ibf/in) 147 (estimated), taber (%) 10A, and gravelometer J400 10A. Coating 1 is also prepared with high aspect ratio wollastonite. Another sample of coating 1 provided the following physical data: tensile, 3540 psi; elongation 726.7%; 0.06 taber %; 125.6 GE impact % elongation; gravelometer (%), 0.1; die C tear (lb./in) 512.2. Coating 1 was made using the following components where the A component and B component were mixed in a 1 to 1 ratio by volume.

| B Component | Weight Percentage |
|---|---|
| Jeffamine 2000 | 32.87 |
| Jeffamine T-5000 | 16.28 |
| IPDA | 6.19 |
| Clearlink 1000 | 41.46 |
| Coupling Agent Z6040 | 2.1 |
| UV Stabilizer | 1.11 |

| A Component | Weight Percentage |
|---|---|
| IPDI | 46.84 |
| Jeffamine 2000 | 50.38 |
| Propylene Carbonate | 2.79 |
| % NCO | 15.59 |

Coating 2

Another aliphatic polyurea system was formulated identical to coating 1 except this system was translucent whereas coating 1 was pigmented. A sample of coating 2 provided the following physical data: tensile, 3297 psi; elongation 753.1%; 0.11 taber %; 150.2 GE impact % elongation; gravelometer (%), 0; die C tear (lb./in) 490. Coating 2 was made using the following components where the A component and B component were mixed in a 1 to 1 ratio by volume.

| B Component | Weight Percentage |
|---|---|
| Jeffamine 2000 | 31.29 |
| Jeffamine T-5000 | 8.86 |
| IPDA | 6.66 |
| Clearlink 1000 | 39.88 |
| UV Stabilizer | 0.7 |
| Coupling Agent Z6040 | 1.54 |
| Pigment Dispersion | 11.07 |

| A Component | Weight Percentage |
|---|---|
| IPDI | 47.43 |
| Jeffamine 2000 | 52.57 |
| % NCO | 15.74 |

The components used to make Coatings 1 and 2 were sprayed onto steel substrates and subjected to a variety of tests including spraying the coatings on 1022 mild steel panels, then impacting rocks at 50 miles per hour. This is the Gavelometer J400 rating. Coatings 1 and 2 had a rating of 10A for this test based on chip and scuff analysis after at least 1 pint of gravel was accelerated at the coated metallic substrate. Coating 1 shows a weight loss of 0.04% after 200 pints of impacts.

Taber abrasion testing, in general, is conducted by preparing a 4 square inch coated steel alloy plat having a ½ inch hole in the center to attach the plate to the test instrument. In this procedure, the original weight of a specimen is measured and recorded, then the specimen is placed on the abrasion tester. A 500 gram load is placed on top of the abrader wheel and allowed to spin for a set number of revolutions. Different abrading wheels were used: CS17, H-18, and H-22. A haze measurement or final weight is taken.

The coatings were subjected to a variety of other tests according to military test specifications, including but not limited to weather resistance testing such as use of a QUV Accelerated Weathering Tester according to Mil-PRF-85285D, fluid resistance tests according to Mil-PRF-85284D and possessed excellent tensile retention and elongation retention after extended immersion.

Example 2

Aromatic Polyurea Systems

The following table provides examples of small-scale aromatic polyurea formulations and their properties. In this table, the polyether polyol was a polytetramethylene ether glycol having a molecular weight of 1000, and the higher molecular weight polyether polyol was a polytetramethylene ether glycol having a molecular weight of 2000.

| | Weight % | | | | | |
|---|---|---|---|---|---|---|
| | ArP-1 | ArP-2 | ArP-3 | ArP-4 | ArP-5 | ArP-6 |
| A Component | 61 | 60 | 56 | 58 | 57 | 57 |
| Polyether Polyol | | 34 | 35 | 34 | 35 | |
| Polyester Polyol | 28 | | | | | 35 |
| Diluent | 11 | 5.7 | 8 | 8 | 8 | 8 |
| B Component | | | | | | |
| UNILINK 4200 | 30 | 27 | 27 | 26 | 24 | 33 |
| ETHACURE 100 | 7.5 | 6 | 8 | 5 | 12 | 5 |
| JEFFAMINE D2000 | 62.5 | 67 | 53.6 | 69 | 42.5 | 62 |
| JEFFAMINE T5000 | | | 11 | | 9 | |
| Nanotubes multi-walled (Applied Sciences) | | | 0.4 | | 0.5 | |
| Properties | | | | | | |
| Prepolymer Viscosity at 23 C. (cps) | 410 | 858 | 780 | 870 | 960 | 720 |
| Approximate Tg Range and Storage Modulus at alpha transion | −45 C. to 10 C., peak at −20 C. 390 kPSI | −50 C. to 10 C., peak at −28 C. 350 kPSI | −60 C. to 10 C., peak at −29 C. 390 kPSI | −70 C. to 10 C., peak at −30 C. 575 kPSI | −60 C. to 0 C., peak at −27 C. 490 kPSI | −45 C. to 10 C., peak at −21 C. 260 kPSI |
| Young's Modulus (psi) | 22,592 | 20,388 | 27,845 | 19668 | 21,441 | 26,944 |
| Tensile Strength (psi) | 2760 | 3550 | 3940 | 3200 | 3335 | 2470 |
| Elongation (%) | 80 | 240 | 200 | 210 | 202 | 50 |

The following table provides examples of aromatic polyurea formulations that were scaled up to 5 gallon quantities (5 gallons of each of Components A and B) and sprayed. The table includes the properties of the sprayed systems. In this table, the polyether polyol was a polytetramethylene ether glycol having a molecular weight of 1000, and the higher molecular weight polyether polyol was a polytetramethylene ether glycol having a molecular weight of 2000. ETHACURE 100 is a mixture of isomers of diethyletoluenediamine. UNILINK 4200 is a secondary aromatic diamine (N,N'-dialkylamino-diphenylmethane) has a molecular weight of about 310. The numbers in parentheses show desirable weight ranges for each of the components in each of the examples ArP-7 and ArP-8.

|  | Weight % | |
| --- | --- | --- |
|  | ArP-7 | ArP-8 |
| MDI | 56 (40-60) | 59 (30-65) |
| Polyether Polyol |  | 32 (15-45) |
| Polyether Polyol (higher MW) | 36 (20-70) |  |
| Diluent | 8 (0-15) | 9 (0-20) |
| B Component |  |  |
| UNILINK 4200 | 27 (5-38) | 27 (10-48) |
| ETHACURE 100 | 7 (2-18) | 7 (0-18) |
| JEFFAMINE D2000 | 50 (20-70) | 49 (20-70) |
| JEFFAMINE T5000 | 10 (0-30) | 10 (0-30) |
| Silane Coupling Agent | 2 (0-5) | 2 (0-8) |
| Pigment | 2 (0-10) | 3 (0-10) |
| UV Stabilizer | 2 (2-8) | 2 (2-8) |
| Properties |  |  |
| Prepolymer Viscosity at 25 C. (cps) | 900 | 780 |
| Gel Time | 10 seconds | 10 seconds |
| Die C Tear Strength | 660 pli | 616 pli |
| Young's Modulus | 15,920 psi | 12,438 psi |
| Tensile Strength | 3,866 psi | 4,509 psi |
| Elongation (%) | 650 | 707 |

The materials in the second table were subjected to testing as per Example 1, and possessed excellent impact resistance as well as tensile retention and elongation retention.

Further modifications and alternative embodiments of this invention will be apparent to those skilled in the art in view of this description. Accordingly, this description is to be construed as illustrative only and is for the purpose of teaching those skilled in the art the manner of carrying out the invention. It is to be understood that the forms of the invention herein shown and described are to be taken as illustrative embodiments. Equivalent elements or materials may be substituted for those illustrated and described herein, and certain features of the invention may be utilized independently of the use of other features, all as would be apparent to one skilled in the art after having the benefit of this description of the invention.

What is claimed is:

1. A process for coating a metallic surface of an aircraft, comprising: applying to the metallic surface a composition that polymerizes to form a polyurea wherein the polyurea is formed from an A-side and a B-side, where the weight percents of components for the A-side are: from about 30 to about 65 percent of polyisocyanate; from about 15 to about 70 percent of a polytetramethylene ether glycol; diluent, from 0 to about 20 percent; where the weight percents of components for the B-side are: from 35 to about 40 percent of one or more diamines; from about 20 to about 70 percent of one or more amine terminated polyether polyols, and wherein the polyurea has a tensile strength of more than 3500 psi and at least 700% elongation.

2. The process of claim 1, wherein the metallic surface is composed of steel.

3. The process of claim 1, wherein the polyurea is an aliphatic polyurea.

4. The process of claim 1, wherein the polyurea is an aromatic polyurea.

5. The process of claim 1, wherein the composition is applied by spraying.

6. The process of claim 1, wherein the polyisocyanate is hexamethylene diisocyanate, tetramethyl xylylene diisocyanate, cyclohexane diisocyanate, 1 isocyanato-3,3,5-trimethyl-5-isocyanatomethylcyclohexane(isophorone diisocyanate); 4,4'-, 2,2'- and 2,4'-dicyclohexylmethane diisocyanate, or a combination thereof.

7. The process of claim 1, wherein the polyisocyanate is formed from methylene bis(4-phenylisocyanate), p-phenylene diisocyanate, polymethylene polyphenylisocyanate, 2,6-toluene diisocyanate, dianisidine diisocyanate, bitolylene diisocyanate, naphthalene 1,4-diisocyanate, bis(4-isocyanatophenyl)methane, bis(3-methyl-3-iso-cyanatophenyl) methane, bis(3-methyl-4 isocyanatophenyl)methane, 4,4'-diphenylpropane diisocyanate, or a combination thereof.

8. The process of claim 1, wherein the polyurea is formed using a polytetramethylene ether glycol having a molecular weight of from about 1000 to about 2000 and in an amout from 30 to 40 percent.

9. The process of claim 1, wherein the one or more diamines is cis-1,4-diaminocyclohexane; isophoronediamine; m-xylylenediamine; 4,4'-methylenedicyclohexylamine; menthanediamine; 1,4-diaminomethylcyclohexane; or a combination thereof.

\* \* \* \* \*